2,799,693
ETHYL SILICATE

Douglas Peter Dodgson, Newport, England, assignor to Monsanto Chemicals Limited, London, England, a British company No Drawing. Application October 20, 1952,
Serial No. 315,851

Claims priority, application Great Britain
October 23, 1951

2 Claims. (Cl. 260—448.8)

This invention relates to a new form of ethyl silicate of particular value for use in the production of refractories, especially in precision casting, as well as for other purposes.

The use of ethyl silicate as a binding agent for refractory substances in the preparation of refractories in general, and particularly of refractory moulds for use in precision casting, is now a standard procedure. Thus a refractory of good quality can be obtained using ethyl silicate as a binding agent by mixing aqueous or more usually aqueous alcoholic ethyl silicate (to which a hydrolysing agent for the ethyl silicate has been added) with a refractory substance such as calcined fireclay in powder form to form a slurry or mix, shaping this to the desired form, a brick or mould for instance, allowing the ethyl silicate to gel and thus setting the shaped article, and firing the product at a high temperature at which the gel is converted to silica. This cements the particles of the refractory substance together to form a firm product. Attention is drawn to British specifications Nos. 575,734, 604,698, 621,737 and 639,802.

The hydrolysing agent used can for instance be an acid such as hydrochloric acid (see Cogan and Setterstrom, Ind. Eng. Chem., 39, (1947), 1364) or one of the organic bases described in British specifications Nos. 575,752, and 612,622.

This technique is of particular value in the "lost wax" process of precision casting. In this process a wax replica is made of the casting required and this is embedded in a slurry or mix of a refractory substance and the ethyl silicate, which is allowed to set round the wax by gelling of the ethyl silicate. The mass is then fired to melt the wax and leave a refractory mould in which molten metal can be poured. It is not altogether necessary to use wax, and other substances, such as fusible plastics, are also suitable; in referring to the "lost wax" process in this specification the use of these other substances is included also. An illustration of the technique is given in British specification No. 660,604, and reference is also made to Dunlop's article in the Foundry Trade Journal, 75, (1945), 107.

Although in the above remarks ethyl silicate has been referred to without qualification, there are in fact a number of different chemical forms of ethyl silicate, that is to say the ethyl silicate can be tetraethyl orthosilicate of the formula $$Si(OC_2H_5)_4$$

or a partially condensed form of ethyl silicate. Ethyl silicate is normally prepared by the reaction of silicon tetrachloride and ethyl alcohol, and the chemical constitution of the product depends on such factors as the amount of water present when this reaction takes place. Thus if absolute alcohol is employed and the conditions are anhydrous the product is tetraethyl orthosilicate, whereas if a quantity of water is present condensed products are obtained, possibly owing to partial hydrolysis of the orthosilicate which may first be formed. Thus the simplest condensed product would be $$(C_2H_5O)_3-Si-O-Si-(OC_2H_5)_3$$

and various condensed forms of ethyl silicate containing multiple siloxane linkages of the type $$-Si-O-Si-O-Si-$$

and of different degrees of condensation are possible.

It will be appreciated that the higher the degree of condensation of the ethyl silicate the higher its $SiO_2$ content, that is to say its silicon content expressed as $SiO_2$, and this provides a suitable method of defining the ethyl silicate. The $SiO_2$ content of tetraethyl orthosilicate itself is about 28.8%, and other forms of ethyl silicate are available with $SiO_2$ contents much higher than this. Thus ethyl silicate of about 40% $SiO_2$ content is well known commercially. It has, however, proved a matter of difficulty to obtain ethyl silicate of a $SiO_2$ content much higher than this, as attempts to produce it (for instance by introducing more water when reacting silicon tetrachloride with ethyl alcohol) usually lead to the precipitation of some form of siliceous product instead of the formation of a liquid ethyl silicate of the higher degree of condensation.

The present invention is for a new form of ethyl silicate, namely ethyl silicate having an $SiO_2$ content of above 50%, and for methods of obtaining it. By means of these methods it has for instance been possible to produce a very satisfactory and physically homogeneous liquid ethyl silicate containing 55% or more of $SiO_2$, and this has been found to be particularly useful for the production of refractories in the manner described above, especially in precision casting.

The ethyl silicate of the invention can be obtained by esterifying silicon tetrachloride with aqueous ethyl alcohol containing a low concentration of water (say less than 11% by weight and suitably about 8% by weight) but used in a quantity large enough for sufficient water to be introduced in this way to bring about the condensation of the ethyl silicate to the required degree. It will be appreciated that in order to obtain a condensed ethyl silicate of a given $SiO_2$ content the amount of water corresponding to this degree of hydrolysis must be introduced but most methods of introducing the water result in a precipitation once the quantity of water exceeds that corresponding to an $SiO_2$ content much above 40%. If the water is introduced in the form of aqueous ethyl alcohol in which the concentration of water is kept low, as described here, a product of a higher $SiO_2$ content can be obtained without this precipitation taking place. Of course, a substantial excess of alcohol is then introduced relative to the silicon tetrachloride, but this can be removed after the reaction.

In practice in a process of this kind air is usually blown through the product in order to remove the hydrogen chloride formed, and the excess of alcohol will be removed in this blowing operation. Furthermore as the ethyl silicate product will contain not only condensed ethyl silicate molecules but also a certain amount of residual tetra ethyl orthosilicate, a quantity of this orthosilicate and even of the lower ethyl silicate polymers present will also be removed in the air blowing. For this reason a convenient method of operating the process as a whole is to introduce in the first place rather less water than is necessary by itself to form an ethyl silicate of the required $SiO_2$ content and to remove part at least of the more volatile ethyl silicates in the product by air blowing, thus leaving a final product containing the required amount of $SiO_2$.

By this means it has been found possible to obtain a liquid ethyl silicate with an $SiO_2$ content as high as 60%, though the viscosity was then rather high for convenient handling and the product had a tendency to solidify on storage. With an $SiO_2$ content much higher than this the ethyl silicate tends to become solid. An ethyl silicate prepared in the above manner containing about 55% of $SiO_2$ was on the contrary found to be quite fluid, and capable of being stored without apparent deterioration for at least five months.

Another method of making the high $SiO_2$ content ethyl silicate of the invention is to treat an ethyl silicate of lower $SiO_2$ content, conveniently one having an $SiO_2$ content of about 40%, with the same aqueous ethyl alcohol containing a low concentration of water, again in a quantity large enough for sufficient water to be introduced to bring about the further condensation of the ethyl silicate to the required degree. It is then usually sufficient to allow the reagents to stand together in the presence of a hydrolysing agent, for instance hydrochloric acid. Here again it may be convenient to remove part of the more volatile ethyl silicates which may be present in the product, but if a commercial ethyl silicate of say 40% $SiO_2$ content is used as starting material some such reduction of the proportion of volatile ethyl silicate may already have been effected.

The invention is illustrated by the following examples, in which the ethyl alcohol used was in the form of industrial methylated spirit. This is a convenient commercial form of ethyl alcohol.

*Example 1*

2,550 grams of silicon tetrachloride and 3,500 grams of industrial methylated spirit (containing about 8% of water by weight, i.e. in the neighbourhood of 5½% or a little more by volume) were run simultaneously at equal rates by volume into a glass reaction vessel equipped with a water-cooled condenser and a stirrer, and immersed in a waterbath maintained at about 55° C. The addition was made as rapidly as possible without causing such an excessive rate of evolution of hydrogen chloride that the gas entrained appreciable quantities of the liquid reactants. When all the silicon tetrachloride had been run in, the addition of the alcohol was continued in the same way until complete.

When all the reactants had been added, a vigorous stream of air at room temperature was passed through the reaction mixture maintained at 55° C. by the water bath. Some moisture also gained access during this operation. The passage of the air was continued for about 4 hours, by which time the concentration of hydrogen chloride in the product had been reduced to about 0.007% by weight and a quantity of the more volatile ethyl silicates present had been removed.

The product was an opaque yellow mobile liquid having an $SiO_2$ content of about 55% and a specific gravity of 1.25 at 26° C. The opacity could be removed by filtration.

*Example 2*

170 grams of silicon tetrachloride and 275 grams of the industrial methylated spirit referred to in Example 1 were run simultaneously at equal rates by volume into a glass reaction vessel as described in Example 1, and the procedure described in Example 1 was again followed. Air was again passed through the reaction mixture for about 4 hours, by which time the concentration of hydrogen chloride in the product had been reduced to below 0.01% by weight.

The product was an opaque yellow viscous liquid having an $SiO_2$ content of about 60%.

*Example 3*

138 grams of a commercial ethyl silicate having a nominal $SiO_2$ content of about 40% (the exact $SiO_2$ content was just over 43%) were dissolved in 100 grams of the industrial methylated spirit referred to in Example 1, and two drops of concentrated hydrochloric acid were added. The mixture was allowed to stand overnight, and the alcohol was then removed by distilling under vacuum.

There remained 107 grams of a liquid ethyl silicate which was found to have an $SiO_2$ content in the vicinity of 56%.

What is claimed is:

1. A process for the production of a liquid, partially condensed form of ethyl silicate having an $SiO_2$ content of above 50%, comprising reacting a partially condensed ethyl silicate having an $SiO_2$ content of about 40% with an aqueous ethyl alcohol containing less than 11% by weight of water based upon said alcohol, said water being sufficient to partially condense said ethyl silicate to an $SiO_2$ content of above 50%.

2. The process of claim 1 wherein the aqueous ethyl alcohol contains about 8% by weight of water.

References Cited in the file of this patent

UNITED STATES PATENTS

| | | |
|---|---|---|
| 1,809,755 | King et al. | June 9, 1931 |
| 2,154,079 | Weiss | Apr. 11, 1939 |
| 2,490,691 | Langkammerer | Dec. 6, 1949 |

FOREIGN PATENTS

| | | |
|---|---|---|
| 568,545 | Germany | Jan. 21, 1933 |
| 621,742 | Great Britain | Apr. 19, 1949 |

OTHER REFERENCES

Andrianov: "Compt. Rend. Acad. Sci., U. S. S. R.," vol. 28, pp. 66–69 (1940). English translation of 5 pages available in Div. 31, translation received March 21, 1945.)

Shaw et al.: "Industrial Chemist," February 1946, pp. 61–65.